(12) United States Patent  
Russell

(10) Patent No.: US 7,657,397 B2  
(45) Date of Patent: Feb. 2, 2010

(54) STATISTICAL METHOD AND SYSTEM FOR TAKING PERFORMANCE MEASUREMENTS

(75) Inventor: Richard Gains Russell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 11/676,621

(22) Filed: Feb. 20, 2007

(65) Prior Publication Data

US 2007/0143077 A1    Jun. 21, 2007

Related U.S. Application Data

(63) Continuation of application No. 11/113,111, filed on Apr. 22, 2005, now Pat. No. 7,197,432.

(51) Int. Cl.  
*G06F 11/30* (2006.01)  
(52) U.S. Cl. ...................................... 702/182  
(58) Field of Classification Search ................. 702/182, 702/186; 714/47; 717/131  
See application file for complete search history.

(56) References Cited

U.S. PATENT DOCUMENTS

2003/0204789 A1*  10/2003  Peebles et al. ................. 714/47  
2005/0125199 A1    6/2005  Slaight ........................ 702/186  
2005/0155022 A1*  7/2005  DeWitt et al. ................ 717/131  
2005/0278597 A1*  12/2005  Miguelanez et al. ........ 714/738

\* cited by examiner

*Primary Examiner*—Tung S Lau  
*Assistant Examiner*—Xiuquin Sun  
(74) *Attorney, Agent, or Firm*—Woodcock Washburn LLP

(57) ABSTRACT

A method of determining a performance characteristic of a system is accomplished through the use of descriptive statistics and key ratios. A predetermined amount of measurements are taken to test a system performance characteristic. The measurements are compiled and descriptive statistics and key ratios are determined from the measurements. The descriptive statistics and key ratios are analyzed to determine if a satisfactory measurement of the system performance was determined. If a satisfactory measurement for the system performance was not determined, additional measurements are taken until the descriptive statistics and key ratios indicate a satisfactory measurement for the system performance was determined. Once a satisfactory measurement for the system performance is determined, the value is recorded and stored.

20 Claims, 4 Drawing Sheets

US 7,657,397 B2

STATISTICAL METHOD AND SYSTEM FOR TAKING PERFORMANCE MEASUREMENTS

REFERENCE TO CO-PENDING APPLICATIONS

This application is a continuation application of and claims priority to U.S. application Ser. No. 11/113,111, filed Apr. 22, 2005, entitled "Statistical Method And System for Taking Performance Measurements," which is hereby incorporated by reference in its entirety.

FIELD OF THE INVENTION

This invention relates in general to statistical measurements of systems. More particularly, this invention relates to the determination of a performance characteristic of a system.

BACKGROUND OF THE INVENTION

Measuring the performance of computer systems and computer system components, including both hardware and software, is often not performed under ideal circumstances. While a performance characteristic of a computer system is non-stochastic, the characteristic is often very difficult to determine. For example, measuring memory performance of a computing system can be accomplished in a laboratory or scientific setting with dedicated software (i.e., the dedicated software is the only software running on the computer). This type of testing makes it easy to obtain very accurate measures of memory performance. This type of testing, however, is rarely practical.

Performance measurements of computer systems or components must often be taken in a computer's normal operational setting, or in a setting or scenario that is close to "real world." In such scenarios, there are often environmental and operational activities or events that can interfere with the performance measurements. For example interrupts, deferred procedure calls, high priority threads, user activity, the movement of the mouse, and network traffic are environmental and operational activities or events that can interfere with the performance measurements.

Further, many computer system performance measurements differ from traditional measurements in that the goal of the performance measurements is to determine the fundamental best possible performance of the system or a system component (hardware or software). This type of determination is in contrast to a simple average, mean, or other measure of central tendency. With respect to memory performance, for example, memory has a maximum throughput rate, often expressed in megabytes or gigabytes per second. Memory can easily be driven at this maximum rate and this maximum rate is a key determinant of system performance. Determining this maximum rate is typically accomplished by taking many different measurements. These different measurements are most often averaged to produce the sole or final measurement.

One problem with this type of measurement is that environmental and operational activities can perturb individual measurements—sometimes greatly. Such perturbations can cause measurements to be "slower" or "longer" than the effective maximum and, thus, such perturbations can drastically affect the measurements causing high measurement error.

Other measurement techniques depend on taking some number of measurements and then averaging them using the arithmetic mean (simply called the average). The problem with this calculation is that it, also, can be greatly effected by even a small number of highly perturbed samples, even when there is a large number of samples. The other problem with this technique is that the number of measurements is often large. This causes the actual measurement time to be longer than actually necessary.

In view of the foregoing, there is a need for systems and methods that overcome the limitations and drawbacks of the prior art.

SUMMARY OF THE INVENTION

Obtaining an accurate measurement of the fundamental performance for a system or a system component (hardware or software) can be accomplished by a different technique—one where a possible object may be to ensure that the real or effective minimum value, maximum value, or some other predetermined value is found. This is done by taking some minimum number of measurements and then using ratios between descriptive statistics to obtain an estimation that the effective minimum or maximum value was determined. Measurements can continue until some condition is satisfied that indicates an effective minimum or maximum was found. This method is in contrast to taking a fixed, and often large, number of measurements.

One way to determine if a valid minimum or maximum value was measured is to use the ratio between the median value of all measurements to the minimum value also called the MZRatio. If this ratio is small in absolute terms or in terms relative to other ratios between descriptive statistics then the minimum or maximum value can be assumed to have been measured.

This method of measurement has two major advantages over more traditional techniques. First, it can run in a shorter period of time because the assessments or measurements cease when it is determined that a valid minimum or maximum value was measured. Second, this method easily factors out individual measurements that were perturbed by external events or activities.

Other features of the present invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Detection or the determination of a performance characteristic is an important piece of information when dealing with a system. By knowing the absolute speed of a computer system, for example, a user can choose appropriate components and software compatible with the absolute speed of the system. Methods for determining a performance characteristic can be used to determine these types of characteristics (e.g., speed of a system).

The present invention is directed to a method for determining a performance characteristic of a system by taking a varying number of measurements. Measurements are halted when a set of rules, statistical measures, heuristics, or other factors indicate that the performance characteristic, for example the minimum, was determined. The set of rules, statistical measures, heuristics, or other factors can include key ratios. An exemplary set of key ratios that can be calculated from a sampling of measurements include the MZRatio (i.e., the ratio between the minimum and the median, the MARatio (i.e., the ratio between the median and the mean), the XARatio (i.e., the ratio between the mean and the maximum, and the MXRatio (i.e., the ratio between the median and the maximum). Additional key ratios can also be determined to use as a trigger to halt the measurements. Further, the key ratios mentioned above can also be compared against each other to calculate additional ratios.

The method of the present invention also can determine if the entire sampling of measurements is tainted based on at least one individual measurement that is perturbed. For example, if the MZRatio is calculated after a sampling to be much greater than 0.02 or 2%, then that value usually indicates that the data sampling is tainted and should not be used, or at the very least, additional samples should be measured. If, however, the MZRatio is very low, or less than 0.02 or 2%, for example, then that value indicates that a performance characteristic was determined.

Exemplary Computing Environment

Figure 1:
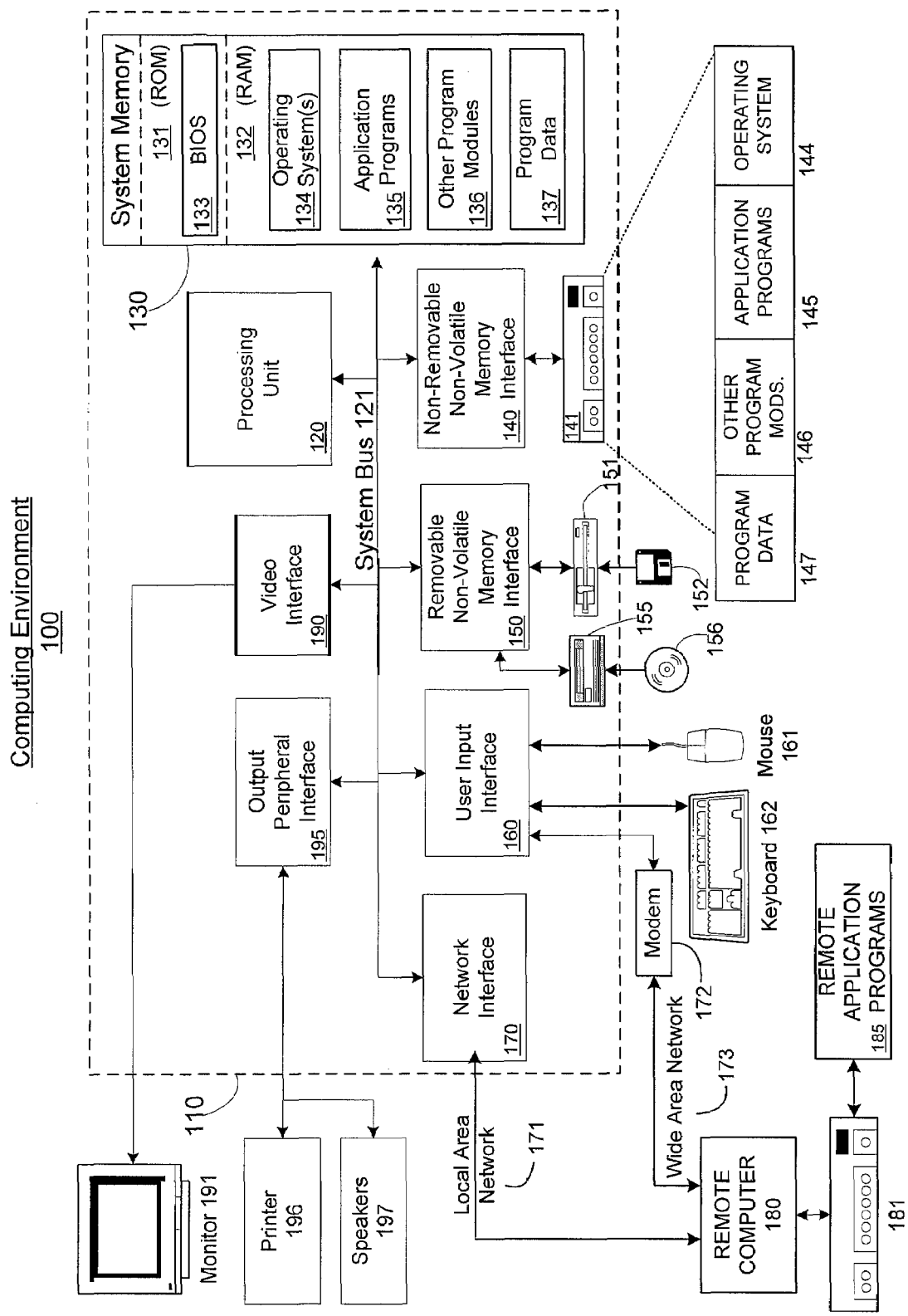
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface (wired or wireless) or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

EXEMPLARY EMBODIMENTS

Figure 2:
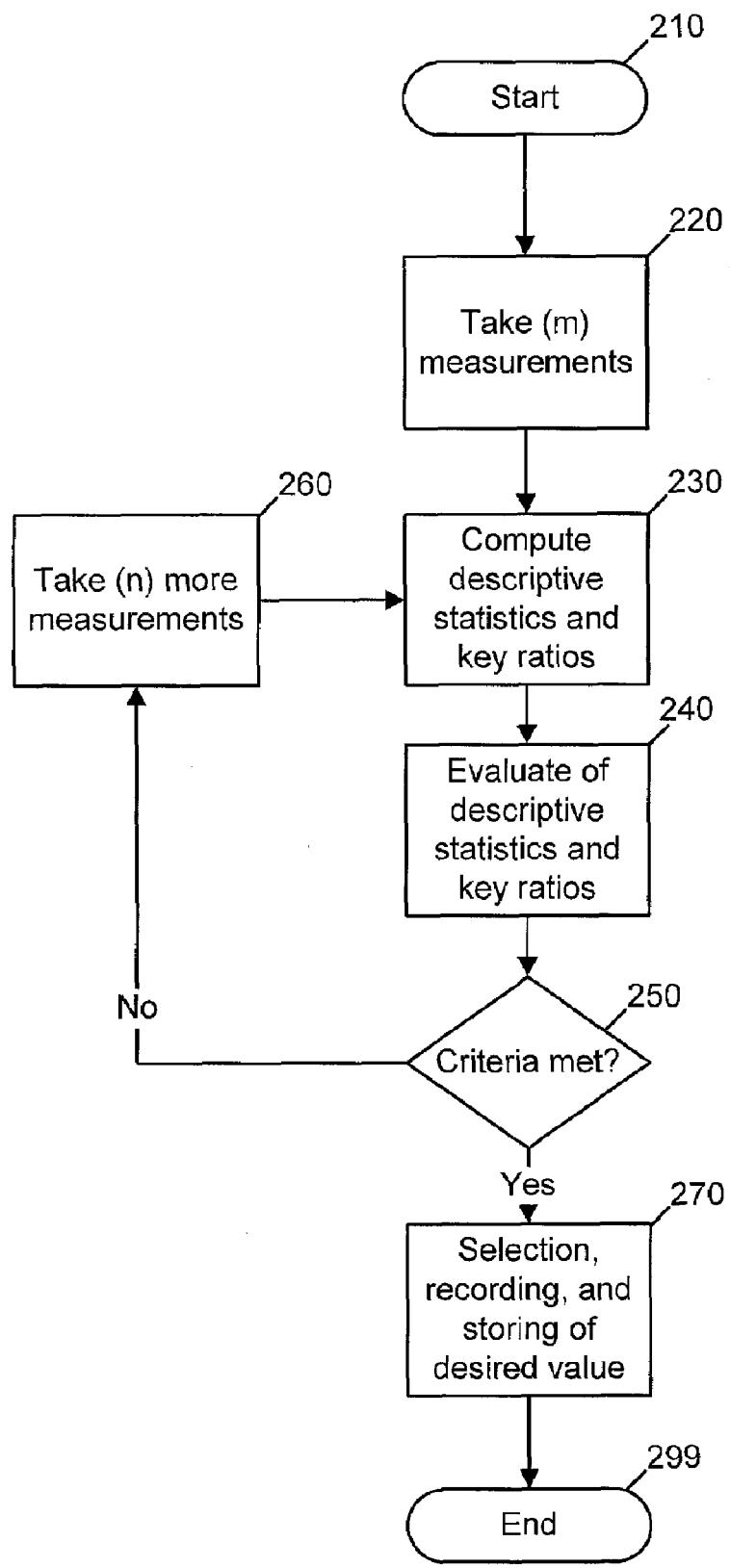
FIG. 2 is a flow diagram of an exemplary method for determined a performance characteristic in accordance with the present invention.

FIG. 2 is a flow diagram of an exemplary method for determining a performance characteristic in accordance with the present invention. The method for determining a performance characteristic is initiated at step 210. A user, a computer, or some other source may initiate the method for determining the performance characteristic at step 210. At step 220, a set of samples is taken to test the system's performance capability. The sampling of (m) number of measurements is performed by testing a system capability or performance characteristic. (m) can be 20-100 measurements, for example. A program, for example, can be run on a computer system 50 times to determine 50 measurements of the processor speed of the processor used in the computer system. Once the (m) number of measurements are taken, the (m) measurements are used to compute descriptive statistics and key ratios at step 230.

Figure 3:
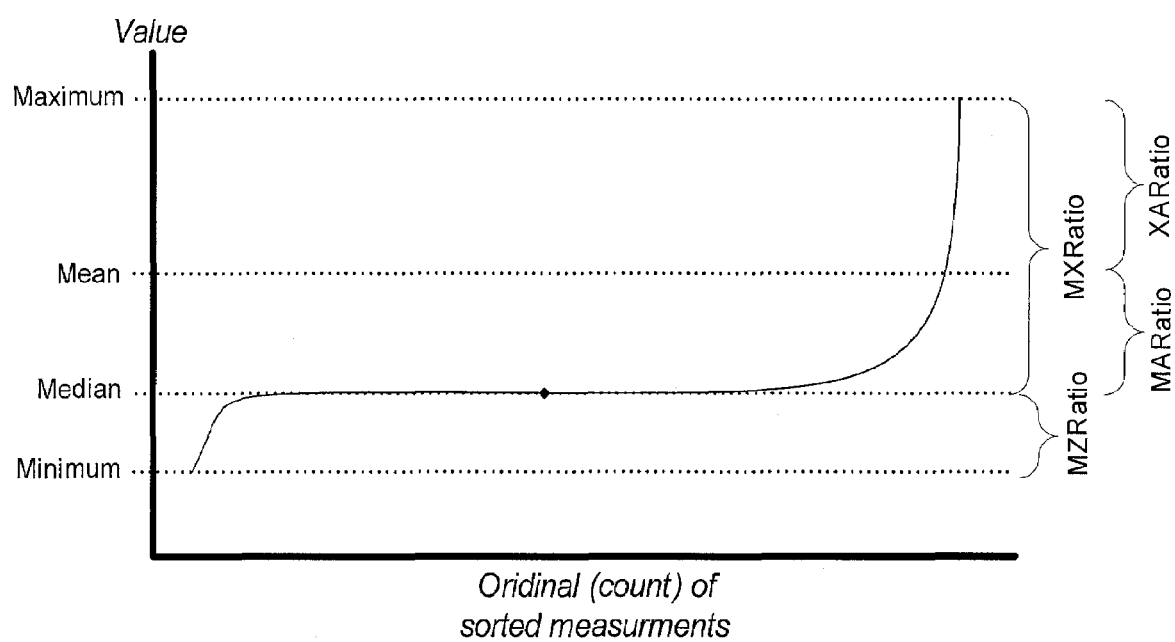
FIG. 3 is a graphic representation of measurements including key ratios in accordance with the present invention.

FIG. 3 is an exemplary graphic representation of measurements including key ratios in accordance with the present invention. The values of the key ratios aid in evaluating whether a performance characteristic was determined at step 240. An exemplary set of key ratios, depicted in FIG. 3, that can be calculated from a sampling of measurements include the MZRatio (i.e., the ratio between the minimum and the median, the MARatio (i.e., the ratio between the median and the mean), the XARatio (i.e., the ratio between the mean and the maximum, and the MXRatio (i.e., the ratio between the median and the maximum). Additional key ratios can also be determined. Further, the key ratios mentioned above can also be compared against each other to calculated additional ratios that are not shown.

Once the descriptive statistics and key ratios are evaluated at step 240, a determination can be made to evaluate if a criteria is met at step 250. If the criteria is not met at step 250, then (n) more measurements can be taken on the system. The procuring of (n) more measurements, for example, can be 1-15 additional measurements at step 260. Once the (n) number of measurements are taken at step 260, the descriptive statistics and key ratios are recalculated using the measurements of (m) and any of the subsequent measurements of (n) at step 230. Another analysis is performed to evaluate whether a criteria is met at step 240. If the criteria is not met at step 250, then again an additional measurements numbering (n) can be taken to amend the descriptive statistics and key ratios. If, however, the criteria is met at step 250, either from the initial (m) measurements or through subsequent (n) measurements, a performance characteristic is recorded and stored at step 270. The performance characteristic can be the minimum value, the maximum value, or some other predetermined value of the sampling of measurements. The method is concluded at step 299.

Figure 4:
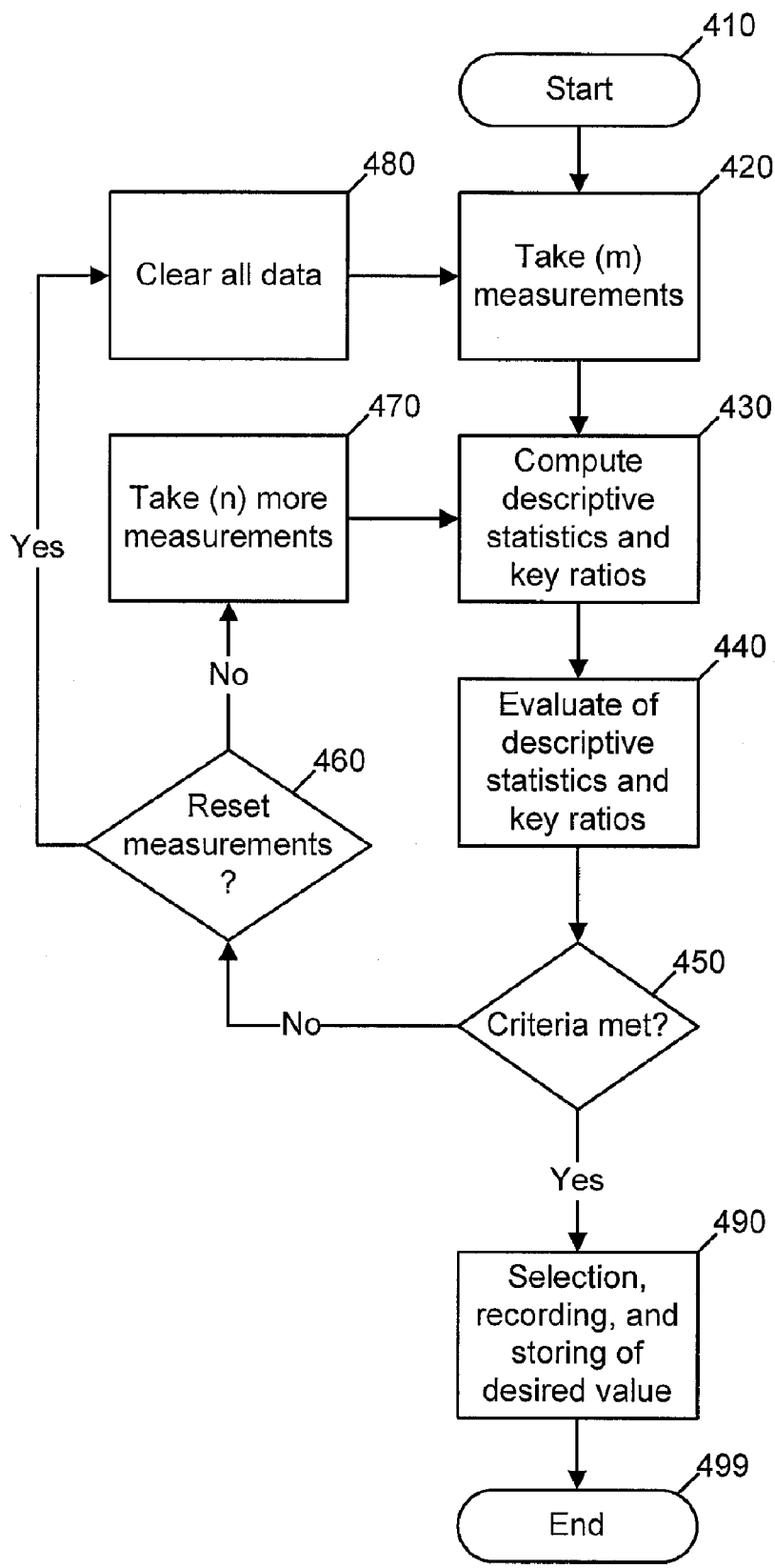
FIG. 4 is a flow diagram of a second exemplary method for determining a performance characteristic in accordance with the present invention.

FIG. 4 is a flow diagram of a second exemplary method for determining a performance characteristic in accordance with the present invention. The method for determining a performance characteristic is initiated at step 410. A user, a computer, or some other source may initiate the method for determining the performance characteristic at step 410. At step 420, a set of measurements are taken to test the system's performance capability. The sampling of (m) number of measurements is performed by testing a system's capability or performance characteristic. Once the (m) number of measurements are taken, the (m) measurements are used to compute descriptive statistics and key ratios at step 430. The values of the key ratios aid in evaluating whether a performance characteristic was determined at step 440.

Once the descriptive statistics and key ratios are evaluated at step 440, a determination can be made to evaluate if a criteria is met at step 450. If the criteria has not been met at step 450, then the user, the computer, or some other decision maker, for example, must decide whether to reset or erase all measurements at 460. A decision to reset or erase all measurements may depend on a finding that individual measurements may have been perturbed by external events or activities. Such perturbed individual measurements can be identified by an analysis of the key ratios, for example, to identify problems with individual measurements. For example, if the MZRatio is calculated after a sampling of measurements is taken and the MZRatio is greater than 0.02 or 2%, then the heightened MZRatio value usually indicates that the data sampling is tainted and should not be used, or at the very least, additional samples should be measured. If the decision maker decides to reset all measurements at step 460, then the data is cleared at step 480 and new measurements numbering (m) are obtained at step 420. If, however, the decision maker does not reset the measurements at step 460, then (n) more measurements can be taken on the system, where (n) can be 1-15 additional samples, for example, at step 470. Once the (n) number of measurements are taken at step 470, the descriptive statistics and key ratios are recalculated using the measurements of (m) and any of the subsequent measurements numbering (n) at step 430. Another analysis is performed to evaluate whether a criteria is met at step 440. If the criteria is not met at step 450, then again an additional (n) measurements are taken to amend the descriptive statistics and key ratios. If, however, the criteria is met at step 450, a performance characteristic is recorded and stored at step 490. The method is concluded at step 499.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A method for evaluating the performance of a computing system, comprising:

receiving a first sampling of a computer system performance measurement, the first sampling comprising a first number of samples of the computer system performance measurement;

determining a set of descriptive statistics and key ratios from the first sampling, wherein the key ratios comprise at least one of a ratio between the minimum value and a median value, a ratio between the median value and a mean value, a ratio between the mean value and the maximum value, and a ratio between the median value and the maximum value;

evaluating the set of descriptive statistics and key ratios to determine whether at least one predetermined criteria has been met;

upon a determination that the at least one predetermined criteria has not been met, determining whether the first sampling of the computer system performance measurement is a perturbed sampling by evaluating the set of descriptive statistics and key ratios, wherein a sampling is perturbed if a key ratio is greater than a specified threshold; and determining a second number of samples of the computer system performance measurement comprising a second sampling of the computer system performance measurement, the second number of samples of the computer system performance measurement based upon the determination of whether the first sampling is perturbed.

2. The method of claim 1, further comprising upon a determination that the first sampling of the computer system performance measurement is perturbed, deleting the perturbed sampling of the computer system performance measurement.

3. The method of claim 2, further comprising: initiating the second sampling of the computer system performance measurement to replace the first sampling; receiving the second sampling; determining a set of descriptive statistics and key ratios based on the second sampling; and determining whether the second sampling of the computer system performance measurement is a perturbed sampling by evaluating the descriptive statistics and key ratios based on the second sampling.

4. The method of claim 3, further comprising
upon a determination that the second sampling of the computer system performance measurement is perturbed, deleting the second perturbed sampling of the computer system performance measurement and reinitiating further samplings until a non-perturbed sampling is received.

5. The method of claim 1, further comprising
recording a value upon a determination that the at least one predetermined criteria is met.

6. The method of claim 5, further comprising receiving additional samplings if the at least one predetermined criteria is not met.

7. The method of claim 6, further comprising determining a set of descriptive statistics and key ratios from the additional samplings.

8. The method of claim 7, further comprising determining whether at least one predetermined criteria is met from the additional samplings.

9. The method of claim 8, further comprising receiving the additional samplings until at least one predetermined criteria is met from the additional samplings.

10. The method of claim 1, wherein the computer system performance measurement is perturbed by an environmental or operational activity.

11. The method of claim 10, wherein the environmental or operational activity includes an interrupt, a deferred procedure call, a high priority thread, a user activity, a mouse movement, or a network traffic activity.

12. A computer readable storage medium having computer-executable instructions stored thereon that when executed by a processor cause said processor to perform a method, the method comprising:
receiving a first sampling of a computer system performance measurement the first sampling comprising a first number of samples of the computer system performance measurement;
determining a set of descriptive statistics and key ratios based on the first sampling, wherein the key ratios comprise at least one of a ratio between the minimum value and a median value, a ratio between the median value and a mean value, a ratio between the mean value and the maximum value, and a ratio between the median value and the maximum value;
evaluating the set of descriptive statistics and key ratios to determine whether at least one predetermined criteria has been met;
upon a determination that the at least one predetermined criteria has not been met, determining whether the first sampling of the computer system performance measurement is a perturbed sampling by evaluating the set of descriptive statistics and key ratios, wherein a sampling is perturbed if a key ratio is greater than a specified threshold; and
determining a second number of samples of the computer system performance measurement comprising a second sampling of the computer system performance measurement, the second number of samples of the computer system performance measurement based upon the determination of whether the first sampling is perturbed.

13. The computer readable storage medium of claim 12, further comprising computer executable instructions for deleting the perturbed sampling of the computer system performance measurement upon a determination that the first sampling of the computer system performance measurement is perturbed.

14. The computer readable storage medium of claim 13, further comprising computer executable instructions for:
initiating the second sampling of the computer system performance measurement to replace the first sampling;
receiving the second sampling; determining a set of descriptive statistics and key ratios based on the second sampling; and
determining whether the second sampling of the computer system performance measurement is a perturbed sampling by evaluating the descriptive statistics and key ratios based on the second sampling.

15. The computer readable storage medium of claim 14, further comprising computer executable instructions for deleting the second perturbed sampling of the computer system performance measurement and reinitiating further samplings until a non-perturbed sampling is received upon a determination that the second sampling of the computer system performance measurement is perturbed.

16. The computer readable storage medium of claim 12, further comprising computer executable instructions for recording a value upon a determination that the at least one predetermined criteria is met.

17. The computer readable storage medium of claim 16, further comprising computer executable instructions for receiving additional samplings if the at least one predetermined criteria is not met and determining a set of descriptive statistics and key ratios from the additional samplings.

18. The computer readable storage medium of claim 17, further comprising computer executable instructions for determining whether at least one predetermined criteria is met from the additional samplings and receiving the additional samplings until at least one predetermined criteria is met from the additional samplings.

19. The computer readable storage medium of claim 12, wherein the computer system performance measurement is perturbed by an environmental or operational activity.

20. The computer readable storage medium of claim 19, wherein the environmental or operational activity includes an interrupt, a deferred procedure call, a high priority thread, a user activity, a mouse movement, or a network traffic activity.

* * * * *

UNITED STATES PATENT AND TRADEMARK OFFICE
CERTIFICATE OF CORRECTION

| | | |
|---|---|---|
| PATENT NO. | : 7,657,397 B2 | Page 1 of 1 |
| APPLICATION NO. | : 11/676621 | |
| DATED | : February 2, 2010 | |
| INVENTOR(S) | : Richard Gains Russell | |

It is certified that error appears in the above-identified patent and that said Letters Patent is hereby corrected as shown below:

In column 9, line 40, in Claim 12, delete "measurement" and insert -- measurement, --, therefor.

Signed and Sealed this
Tenth Day of May, 2011

David J. Kappos
*Director of the United States Patent and Trademark Office*